Nov. 16, 1965 J. H. BIRMAN 3,217,550
GEOTHERMAL PROSPECTING

Filed June 11, 1962 2 Sheets-Sheet 1

INVENTOR.
JOSEPH H. BIRMAN
BY
Christie, Parker & Hale
ATTORNEYS

Nov. 16, 1965    J. H. BIRMAN    3,217,550
GEOTHERMAL PROSPECTING

Filed June 11, 1962    2 Sheets-Sheet 2

INVENTOR.
JOSEPH H. BIRMAN
BY
Christie, Parker & Hale
ATTORNEYS.

United States Patent Office 3,217,550
Patented Nov. 16, 1965

3,217,550
GEOTHERMAL PROSPECTING
Joseph H. Birman, Los Angeles, Calif., assignor to Geothermal Surveys Inc., a corporation of Nevada
Filed June 11, 1962, Ser. No. 201,713
7 Claims. (Cl. 73—432)

This invention relates to methods of geophysical prospecting which permit the detection and location beneath the earth's surface of a body of mineral, fluid, or rock mass possessed of anomalous thermal characteristics as well as the detection of depth variations of such body from point to point over a given surface area. The method of the invention is unique in taking into account and in fact relying upon the effects of sub-surface seasonally induced temperature variations as an aid to the determination of the desired information.

Geothermal prospecting, by which is meant the use of sub-surface temperature measurements in earth prospecting, is not new. Reference may be had to U.S. Patent 2,403,704 as a good example of the prior application of sub-surface thermal information for prospecting purposes. However, all of the methods heretofore proposed depend upon the determination of one or more sub-surface temperatures which, by adjusting the depth and means of temperature measurement, are insensitive to both diurnal and seasonal temperature variations. In the above referenced patent, for example, techniques are specifically spelled out to insure that an equilibrium is reached by taking temperature measurements daily or weekly until successive readings are about the same.

The present invention is predicated on the fact that certain sub-surface structures, deposits, or reservoirs exhibit temperature characteristics which are anomalous in relation to the surrounding formation. For example, a sub-surface water reservoir may, as a result of seepage or actual water flow through the reservoir, exhibit a temperature significantly lower or higher than the surrounding formation. Similarly, many ore deposits are subject to spontaneous and continuous chemical reaction either exothermic or endothermic in nature which result in a deposit temperature differing from that of the surrounding formation. Even large consolidated rock formations will exhibit an anomalous seasonal temperature variation as compared to a surrounding unconsolidated overburden or alluvion due to significant differences in thermal conductivity between the two.

I have found for many reasons that will become apparent that in order to successfully detect and accurately locate such formations, reservoirs or deposits at any time of the year and under conditions where the extent of the temperature anomaly thereof must remain unknown, it is essential not only to sense temperatures from point to point in the overburden, but also to detect deviations at such point of temperature measurement, and furthermore the difference in deviation from point to point over a given period of time as produced by seasonally induced temperature variations in the overburden as distinguished from diurnal variations. The invention therefore contemplates the method of geophysical prospecting to determine the presence and orientation of a sub-surface thermally anomalous stratum in a given geographical area, which comprises locating a plurality of temperature sensors at spaced points and known depths sufficient to avoid diurnal temperature changes but responsive to seasonal temperature changes, allowing the several sensors to reach equilibrium with the immediately surrounding formation, determining the temperature at each of the several sensors at an identical point in time and determining the direction of deviation of the temperature of the body suspected from mean surface temperature whereby the sensor temperatures will vary from each other in accordance with the depth of the sensor and the presence and depth of the body.

Seevral aspects of this statement of invention require some explanation. The composition of surface deposits from area to area of investigation may vary so that it is not possible to generalize as to a depth at which diurnal temperature variations are not detected. Although three to five feet of overburden is generally sufficient to avoid diurnal changes, I have generally used a burial depth of ten feet as entirely safe for this purpose, providing that the hole in which the sensor is located is filled after location with the material removed therefrom. It is not intended of course that this invention be limited by reference to this ten feet depth which is given only as an example in areas that have been prospected with the method as a depth at which diurnal temperature variations do not interfere with the practice of the method.

The temperature sensors preferred for the practice of the invention are thermistors housed in a small diameter metal-tipped probe. Two or more sensors may be located at different points along the length of the probe so that two or more sets of data may be obtained from a like number of sets of sensors, the several sensors of each set being located at the same depth. In order to sense seasonal temperature variations even at the ten foot depth in reasonable time intervals, the temperature sensors should be sensitive to and accurately calibrated to about ±.01° C. Less sensitive sensors are usable but a significant time delay is introduced in such event because of the small temperature changes that are to be measured.

Considering the matter of sub-surface, seasonally induced temperature variations, one must take into account the sensitivity of the probes involved. If infinitely sensitive probes were available it is probable that seasonal variations could be detected at very great depths. However, since many probes are required and since the accuracy and sensitivity of associated sensing and recording equipment is also a limiting factor, I have found as noted above that it is practical to use probes accurate to approximately 0.01° C. This then establishes the parameter upon which to base a discussion of seasonal temperature variations. Again, I have found that probes buried at ten feet below the surface, while not subject to diurnal temperature variations are, if sensitive to 0.01° C. sufficiently sensitive to seasonal temperature variations to permit the practice of the invention which, as noted, takes into account and relies upon the detection of such seasonal temperature variations.

It is important also that the temperatures to be correlated be obtained from the several probes at the same time or that they be read in such a manner that they can be accurately extrapolated to the same time. Simultaneously, readings are of course possible with recorders connected to each probe or with telemetering equipment, or the like. To reduce the cost of associated equipment, it is also possible to manually read values at several probes in an orderly time sequence pattern using several such readings to extrapolate the several probes to a given time.

The method can perhaps be best understood by reference to an actual example of its use as illustrated in the accompanying drawings, in which.

Figure 1:
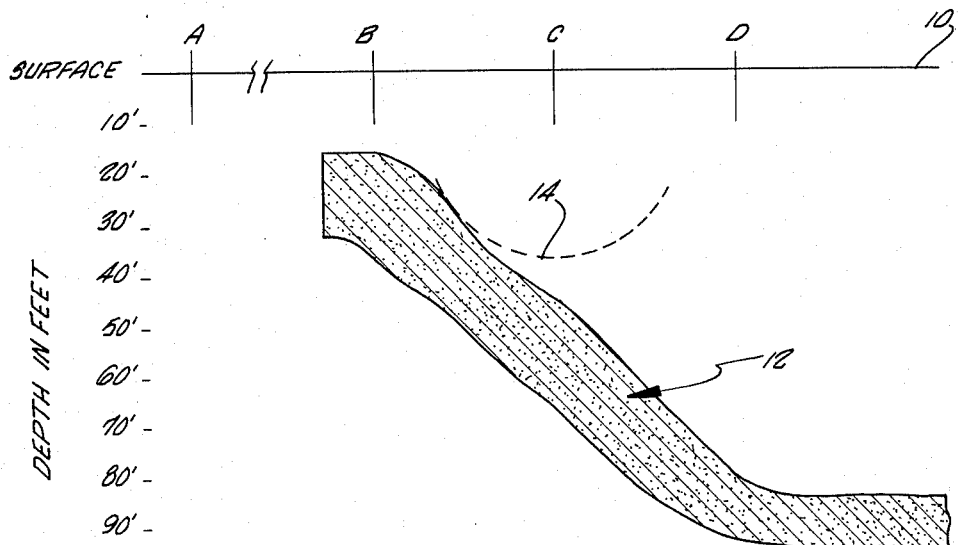
FIG. 1 is a graphical presentation of a hypothetical sub-surface condition.
Figure 2:
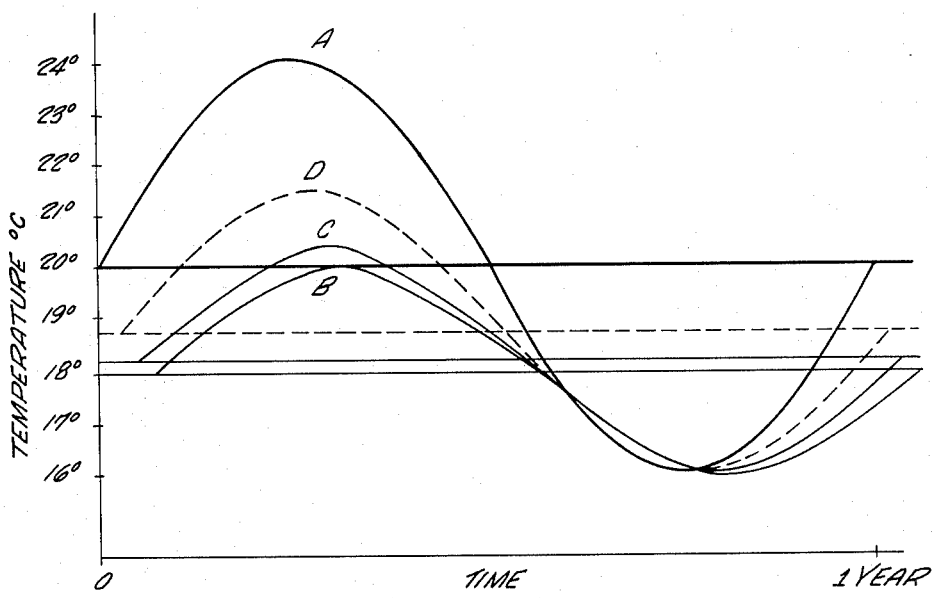
FIG. 2 is a temperature plot for a period of a year of the temperature characteristics encountered in a situation suggested in FIG. 1.

In FIG. 1 the earth's surface is represented by the line 10, and a body 12 of material exhibiting anomalous temperature characteristics is illustrated as lying in an irregular orientation, the body 12 being shown as varying from a depth of 15 feet to a depth of 75 feet on the depth scale at the lefthand side of the figure. Four temperature probes each containing a single sensor and identified as A, B, C and D are schematically illustrated as buried each ten feet below the surface 10. For purposes of discussing the temperature conditions existent at the probes A, B, C and D, it is assumed that the body 12 represents a water reservoir in which there is sufficient water flow to maintain the temperature of the body 12 below the temperature of the surrounding overburden. Such a situation is not uncommon in desert areas. Under these circumstances, the temperatures at the probes A, B, C and D throughout an entire year or temperature cycle will be substantially as shown in FIG. 2. The probe A is physically removed from the body 12 to such an extent that it is not sensitive to temperature conditions resulting from the existence of the body 12 and can therefore be assumed to represent an accurate reflection of the seasonally induced temperature variation at a point ten feet below the surface 10, which condition is illustrated in curve A of FIG. 2. The variation of temperature at probe A from a median value of 20° C. to a maximum of 24° C. and a minimum of 16° C. is a realistic representation of values actually encountered in the application of this method. It is immediately obvious that if the probe is at a deeper or shallower depth, the amplitude of deviation of the curve A from the median of 20° C. will be correlatively decreased or increased. If the probe A is at too shallow a depth there will be superimposed on the seasonal curve A in FIG. 2 a diurnal flutter, which should be avoided in the practice of the method of the invention.

All of the other probes as illustrated show an interference by the anomalous body 12, as particularly evidenced in curve B shown in FIG. 2. It will be observed from the relative locations of curves A and B in FIG. 2 that the extent of deviation of curve B from curve A is a function of both the proximity of the body 12 and the extent of the temperature anomaly exhibited by the body 12. Thus, assuming a given separation of probe B from the body 12, the deviation of the curve B illustrating the seasonal temperature variation of probe B from curve A will be a function of the temperature of the body. Conversely, if the body temperature is known, the deviation between the curves will be a function of the depth of the body and this is illustrated in curves C and D of FIG. 2.

Curve C represents the seasonally induced temperature change at probe C and because the body 12 at probe C is at an effective influence depth of something over 30 feet if it is borne in mind that the closest point of the formation to the probe C is at point 14 and the entire effect of the body 12 on the probe C will be some unknown mathematical function involving the slope of the body 12 from the point 14 to some point lower down on its upper surface. In any event, by reason of the fact that the probe C is responsive to the existence of the body at a depth in the neighborhood of or slightly greater than 30 feet, it more nearly approximates the unaffected curve A than does curve B, and the same is true to a greater extent with respect to probe D and its corresponding curve D in FIG. 2.

If by independent means it is possible to determine the fact that a sub-surface body does exist and that its body temperature is above or below that of the overburden, then it is possible by the method of the invention and with considerable accuracy to determine the depth variations and boundaries of this body by temperature measurements at A, B, C and D, and of course others on a two-dimensional plane by the preparation in advance of approximate curves corresponding to those of FIG. 2 based upon the foreknowledge as predicated. This situation sometimes occurs in areas, for example, where water is known to exist by the existence of present wells and it is desired to explore the area in detail to plot the location and depth of the water table. Under such conditions, one can detect the temperature at the various probes in such a fashion to time equate them.

Table 1 shows the actual time adjusted temperature readings of a large number of probes actually taken in a desert valley in California in which an underground water table of cool water was known to exist. Temperatures are given in columns 2 and 3 taken of an interval of about three weeks and the temperature difference is shown in column 4.

*Table 1*

| Probe # | Temp., ° C., Nov. 11 | Temp., ° C., Dec. 7 | $\Delta t$ |
|---|---|---|---|
| 14 | 22.51 | 21.41 | 1.10 |
| 15 | 22.58 | 21.36 | 1.22 |
| 16 | 22.29 | 20.98 | 1.31 |
| 17 | 22.60 | 21.39 | 1.21 |
| 18 | 22.58 | 21.36 | 1.12 |
| 19 | 22.05 | 21.01 | 1.04 |
| 20 | 20.97 | 19.68 | 1.29 |
| 21 | 22.22 | 21.16 | 1.06 |
| 22 | 21.69 | 20.17 | 1.52 |
| 23 | 19.82 | 19.24 | .58 |
| 24 | 19.78 | 19.17 | .61 |
| 25 | 22.58 | 21.29 | 1.29 |
| 26 | 22.53 | 21.32 | 1.21 |
| 27 | 22.19 | 20.84 | 1.35 |
| 28 | 20.10 | 20.72 | 1.38 |
| 29 | 20.72 | 20.18 | .54 |
| 30 | 20.67 | 20.20 | .47 |
| 31 | 21.07 | 20.28 | .79 |
| 32 | 21.08 | 20.26 | .82 |
| 33 | 21.84 | 20.68 | 1.16 |
| 34 | 21.85 | 20.70 | 1.15 |
| 35 | 22.72 | 21.42 | 1.30 |
| 36 | 22.78 | 21.39 | 1.39 |
| 37 | 22.73 | 21.42 | 1.31 |

The temperature variations which result by reason of the existence of this water table are obvious, and if any calibration can be derived from existing knowledge of, for example, pre-existent wells, the depth of the water table beneath each probe can be quite accurately established over the entire area.

A very significant aspect of the invention, however, is that without a knowledge of the existence of a sub-surface body of known characteristics and without the knowledge of any temperature anomaly that may exist, a single reading of the several probes in an area as exampled exemplified by Table 1 will not enable the determination of the existence or nature or depth of such a body. Perhaps a wide variation in temperature from spot to spot will indicate the existence of something but, without either further temperature information or preexistent knowledge, it is not possible to ascertain whether the higher temperature probes represent the anomaly or whether the lower temperature probes represent the anomaly. This further information can, in accordance with the present invention, be determined by sensing the temperature variations at the several probes together with the extent of variation $\Delta t$ for each probe. With two or three such temperatures obtained at intervals the duration of which may be selected as a function of the sensed rate of variation it is possible by means of a determination of slope and temperature deviation to determine which of the probes are sensing an anomaly and which are not. Clearly from the curve of FIG. 2 and from simple logic, the existence of anomaly, whether it be of higher or lower temperature than the overburden, will attenuate the amplitude of seasonally induced temperature changes at an overlying probe. Also by reference to FIG. 2 it may be observed that the rate of change of temperatures is a function of the time of year. As maximum and minimum are reached, usually in fall and spring respectively, the slope of the curves diminishes and longer intervals may be necessary to show a given deviation than at other times of the year.

It will be observed from Table 1 that the temperature probes measuring the highest temperatures in this instance have the greatest deviation over the period of record, hence indicating quite clearly, if the fact had already not been known in this example, that the probes measuring the lower temperature were the ones being attenuated by the existence of the anomalous body. From the information ascertained from the three columns of data in Table 1, it is possible then to determine (1) that there is an anomalous body beneath the surface of a portion of this area, as evidenced by the significantly different temperature measurements at the several probes; (2) that the probes which are influenced by this body are those measuring the lowest temperature; (3) that therefore the body is at a temperature lower than the overburden, from which information as to its nature can be determined; and (4) depth variations of the body as evidenced by gradations in both temperature differential and Δt from probe to probe. If no foreknowledge existed as to the characteristics of this area, it would be evident from the data shown in Table 1 that there was existent in the area a sub-surface body of lower temperature than the surrounding strata, and from the geology it can be fairly accurately determined that this low temperature body is probably water rather than an ore of endothermic characteristics.

Conversely, to the foregoing example, if those probes showing the highest temperature reading also indicate the least slope or Δt, it would then be evident that an underlying body which produced the significant differences in temperature from probe to probe is of a nature undergoing continuous exothermic reaction, since it is obvious from the slope that the anomalous readings are those of the higher reading probe.

If in a third case, the Δt from probe to probe is about the same while the actual temperature shows a variation, it is likely that an underground formation having no exothermic or endothermic properties exists which differs from the surrounding overburden only in thermal conductivity or heat capacity, and therefore is simply out of phase with the overburden with respect to the seasonal temperature curve. Being out of phase, the body is at a different temperature than the overburden and is anomalous, although perhaps to a smaller degree, in the same fashion as an exothermically or endothermically reactive ore body.

In another circumstance, if the probes exhibiting the highest temperature also show an unusually high Δt, an underlying formation of bed rock of low heat capacity may be indicated.

Figure 3:
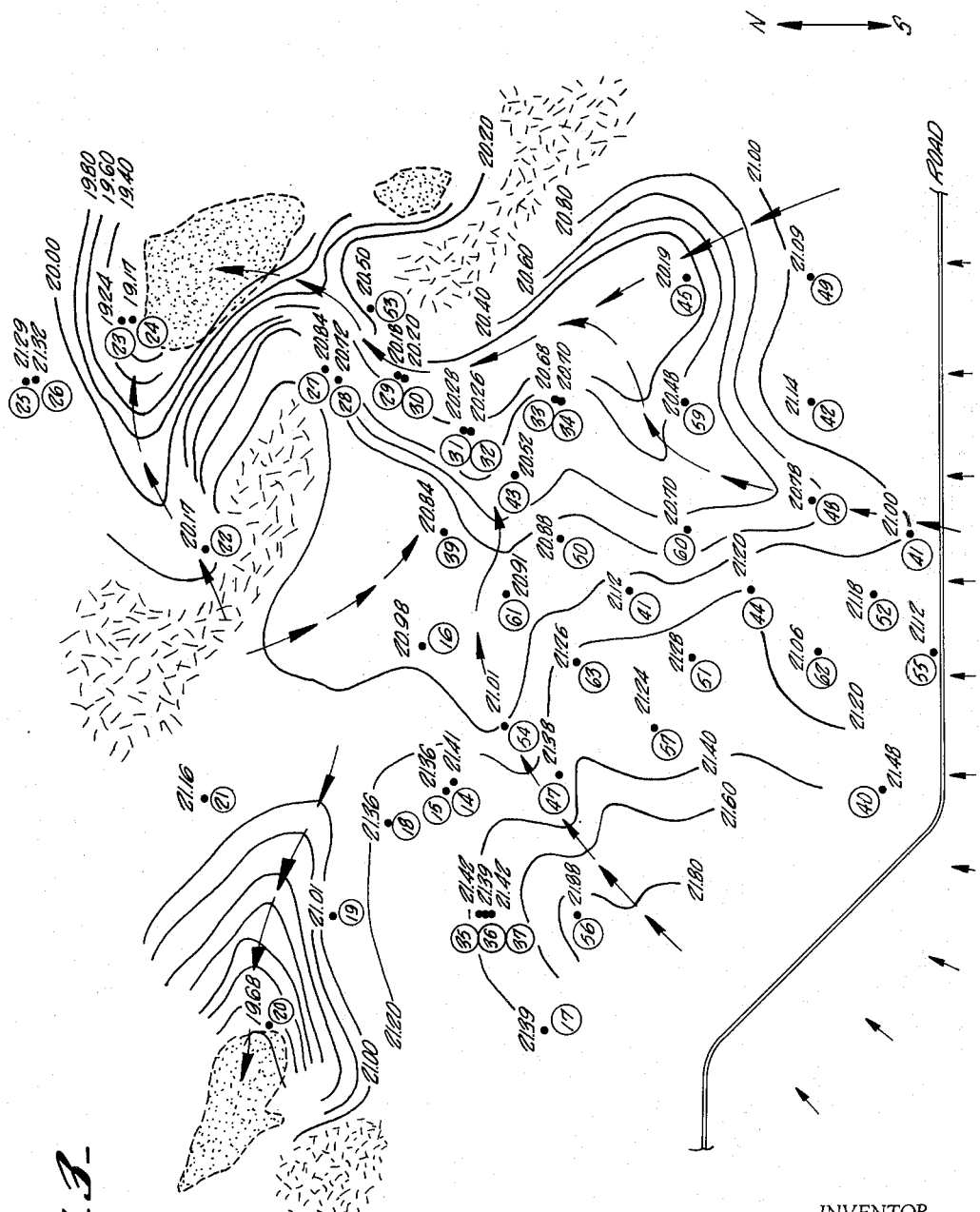
FIG. 3 is a typical areal isothermal profile as actually developed in the practice of the invention in a small area of the Southern California desert.

FIG. 3 shows a plot of the temperature information shown in column 2 of Table 1 on a map of the area being surveyed. The figure is actually based on more data than are shown in the table. Having determined that subsurface water does exist in the area, the isothermal lines on the chart can be employed to determine the nature of sub-surface flow as well as approximate water depth. In the figure, the arrows along the indicated road show the general direction of surface drainage into the mapped area from a range of hills south of the road. The isothermal configuration clearly shows the sub-surface water flow through the area indicated by the arrows superimposed on the isothermal plot. These indicated flow streams are along the isothermal trough. It should be noted that probes 23 and 24 lying closely adjacent an illustrated dry lake, show very low temperature readings and, from Table 1, also very low Δt's indicative of very shallow water. The information as thus derived from the measured values (Table 1) and isothermal plots (FIG. 3) has been, in this particlular instance, substantiated by drilled wells located throughout the area.

I claim:
1. The method of geothermal prospecting in an area to determine the depth and orientation of a subsurface body of anomalous thermal characteristics which comprises the steps of:
 (a) locating a plurality of temperature sensors at spaced points and each buried to a substantially identical depth sufficient to avoid diurnal temperature changes but responsive to seasonal temperature changes;
 (b) allowing the several sensors to reach equilibrium with the immediately surrounding formation;
 (c) determining a first temperature at each sensor; and
 (d) determining independently of step (c) at least one additional temperature at each sensor at a time interval sufficient to show a temperature change whereby the difference in temperature from sensor to sensor as well as the difference in rate of change responsive to seasonal variations is determined.

2. The method of geothermal prospecting in an area to determine the depth and orientation of a subsurface body having low temperature anomalous thermal characteristics which comprises the steps of:
 (a) locating a plurality of temperature sensors at spaced points and each buried to a substantially identical depth sufficient to avoid diurnal temperature changes but responsive to seasonal temperature changes;
 (b) allowing the several sensors to reach equilibrium with the immediately surrounding formation;
 (c) determining a first temperature at each sensor; and
 (d) determining at least one additional different temperature at each sensor after an interval of time whereby the sensors showing the lower temperatures and lower rate of drift will establish the existence and general depth of the body.

3. The method of geothermal prospecting in an area to determine the depth and orientation of a subsurface body having high temperature anomalous thermal characteristics which comprises the steps of:
 (a) locating a plurality of temperature sensors at spaced points and each buried to a substantially identical depth sufficient to avoid diurnal temperature changes but responsive to seasonal temperature changes;
 (b) allowing the several sensors to reach equilibrium with the immediately surrounding formation;
 (c) determining a first temperature at each sensor; and
 (d) determining at least one additional different temperature at each sensor after an interval of time whereby the sensors showing the higher temperatures and lower rates of drift will establish the existence and general depth of the body.

4. The method of geothermal prospecting in an area to determine the location and relative depth of a subsurface body having anomalous thermal characteristics which comprises the steps of:
 (a) locating a plurality of temperature sensors at spaced points and buried to substantially identical depths sufficient to avoid diurnal temperature changes but responsive to seasonal temperature changes;
 (b) allowing the several sensors to reach equilibrium with the immediately surrounding formation;
 (c) determining a first temperature at each sensor; and
 (d) determining at least one additional different temperature at each senor after an interval of time whereby the rate of drift of temperature evidenced at each sensor will indicate whether any of the sensors are evidencing anomalous temperature reading.

5. The method of geothermal prospecting in an area to determine the depth, position and approximate magnitude of subsurface water flow which comprises the steps of:
 (a) locating a plurality of temperature sensors at spaced points over the area and buried to substantially identical depths sufficient to avoid diurnal temperature changes but responsive to seasonal temperature changes;
 (b) allowing the several sensors to reach equilibrium with immediately surrounding formation;
 (c) determining a temperature at each sensor; and
 (d) determining at least one temperature measurement from the water body itself and at a known depth whereby the temperatures at the several sensors can then be correlated with the known temperature to plot the flow of subsurface water in the area and its approximate depth from point to point.

6. The method of geothermal prospecting in an area to determine the depth, position, and approximate magnitude of a subsurface body of anomalous thermal characteristics which comprises the steps of:
   (a) locating a plurality of temperature sensors at spaced points over the area and buried to substantially identical depths sufficient to avoid diurnal temperature changes but responsive to seasonal temperature changes;
   (b) allowing the several sensors to reach equilibrium with the immediately surrounding formation;
   (c) determining a temperature at each sensor; and
   (d) determining at least one temperature measurement from the subsurface body itself and at a known depth whereby the temperatures at the several sensors can then be correlated with the known temperature to plot the areal coverage of the subsurface body and its approximate depth from point to point.

7. The method of geothermal prospecting in an area to determine the location and relative depth of a subsurface body having anomalous thermal characteristics which comprises the steps of:
   (a) locating a plurality of temperature sensors at spaced points and buried to substantially identical depths not below a depth which remains responsive to seasonal temperature changes;
   (b) allowing the several sensors to reach equilibrium with the immediately surrounding formation;
   (c) determining a first temperature at each sensor; and
   (d) determining at least one additional different temperature at each sensor after an interval of time whereby the rate of drift of temperature evidenced at each sensor will indicate whether any of the sensors are evidencing anomalous temperature reading.

References Cited by the Examiner
UNITED STATES PATENTS 2,403,704   7/1946   Blau _____ 73—432

OTHER REFERENCES

Jakosky, "Exploration Geophysics," Trades Mirror Press, Los Angeles (1940), page 662.

Bouwhuijsen, Engineering & Mining Journal, vol. 135, August 1934, pages 342–344.

RICHARD C. QUEISSER, *Primary Examiner.*

DAVID SCHONBERG, *Examiner.*